Jan. 11, 1949.  A. C. HARDY ET AL  2,459,106
COMPUTING APPARATUS

Filed Aug. 6, 1946  6 Sheets-Sheet 1

INVENTORS
Arthur C. Hardy
BY Edward C. Dench
Byerly, Watson & Simonds
ATTORNEYS

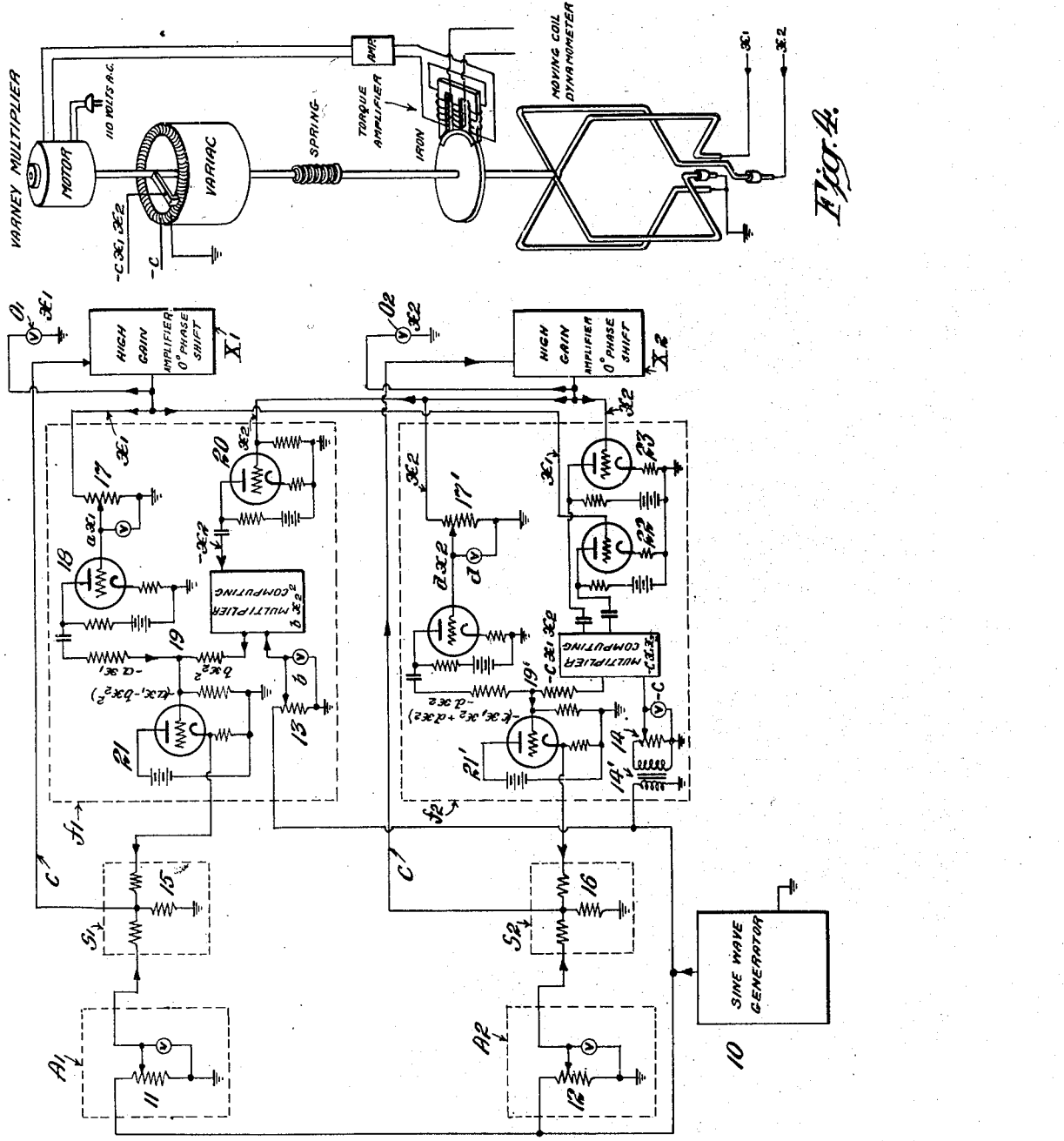

Jan. 11, 1949.  A. C. HARDY ET AL  2,459,106
COMPUTING APPARATUS
Filed Aug. 6, 1946  6 Sheets-Sheet 6

*Fig. 8.*

FROM OTHER COLLECTORS

FILTER $cm(1-y)\ Xcm$ $X'$

INVENTORS
Arthur C. Hardy
BY Edward C. Dench
Byerly, Watson + Simonds
ATTORNEYS

Patented Jan. 11, 1949

2,459,106

UNITED STATES PATENT OFFICE 2,459,106

COMPUTING APPARATUS

Arthur C. Hardy, Wellesley, Mass., and Edward C. Dench, West Hartford, Conn., assignors to Interchemical Corporation, New York, N. Y., a corporation of Ohio Application August 6, 1946, Serial No. 688,750

8 Claims. (Cl. 235—61)

This invention relates to improvements in computing apparatus and provides an electrical apparatus for solving simultaneous equations.

The apparatus provides a very rapid and effective means for indicating or using the values of a plurality of unknown quantities determined by a set of simultaneous equations. The apparatus is of especial value when applied to the solution of simultaneous equations in which the known quantities vary with time, for it provides for a continuous solution of such equations giving at each moment the values of the unknown quantities which correspond to the values assumed by the known quantities at that moment. Another advantage of the apparatus is that it may be used for solving simultaneous equations of such high order that ordinary mathematical methods are impracticable for obtaining the solution.

The principle upon which the apparatus operates is the following:

The apparatus performs electrically, optically or otherwise on a number of signals representing unknown quantities the mathematical operations which the equations indicate are to be performed on the unknown quantities, compares the results of these automatic computations with the values of the known terms of the equations, and automatically adjusts the signals representing the unknowns until the computed functions of the unknowns are approximately equal to the known terms of the equations. The comparison and adjustment is performed electrically and may be effected in not over one one-thousandth of a second, so that the momentary values of the signals follow very closely the momentary values of the unknown quantities required to solve the equations.

The comparison and adjustment is effected by opposing the automatically calculated value of the function of the unknown quantities given in each equation to a signal which equals or represents the value of the known term of that equation, and utilizing the difference between the opposed signals to control the signal representing one of the unknown quantities.

Apparatus embodying the invention will be described in connection with the accompanying drawings in which:

Fig. 3 is a circuit diagram showing the application of the invention to the solution of specific illustrative simultaneous equations;

Fig. 4 is a diagrammatic perspective view of an electric multiplier used in the circuit of Fig. 3;

Fig. 8 is a circuit diagram of one of the square-wave collectors indicated in Fig. 6; and Fig. 9 is a circuit diagram of one of the subtractors indicated in Fig. 5.

A general expression for a set of solvable simultaneous equations is as follows:

$$f_1(x_1, x_2 \ldots x_n) = A_1$$
$$f_2(x_1, x_2 \ldots x_n) = A_2$$
$$\vdots$$
$$f_n(x_1, x_2 \ldots x_n) = A_n$$

where $n$ represents the number of equations, and also the number of unknown quantities which are represented by the symbols $x_1, x_2 \ldots x_n$, and where $A_1 \ldots A_n$ are known quantities, constant or variable, simple or complex.

Figure 1:
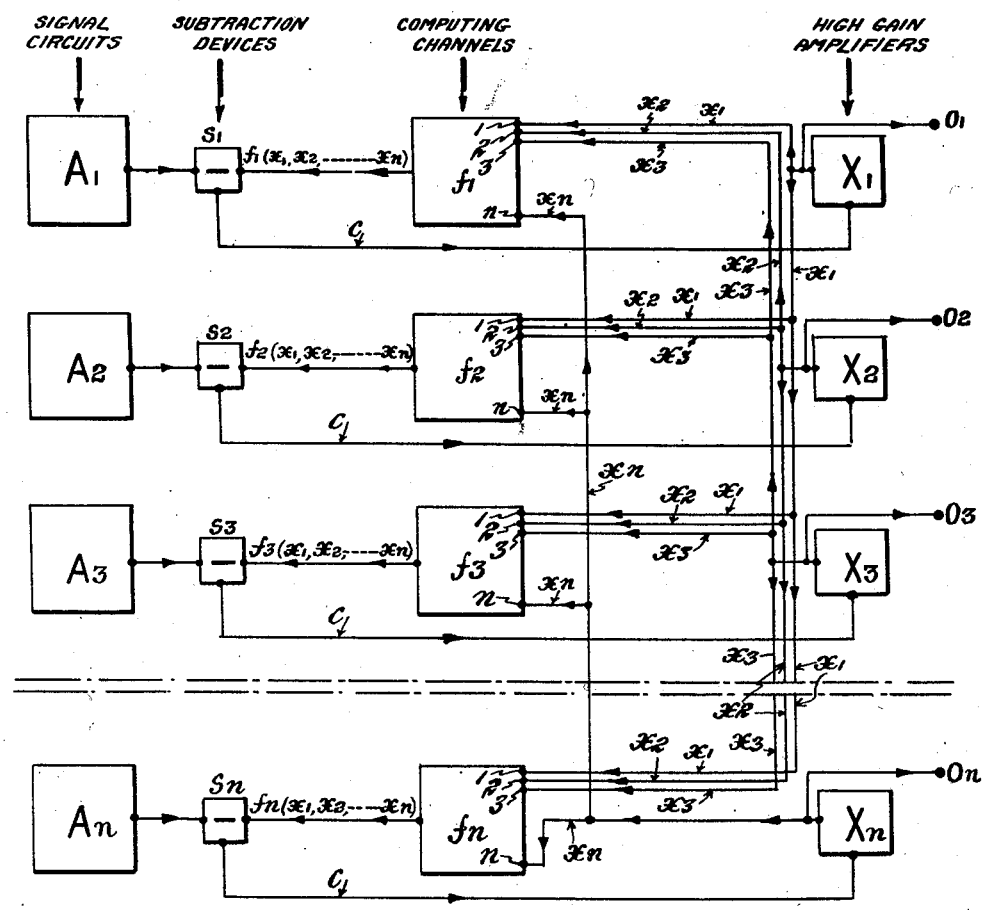
Fig. 1 is a diagram of the whole apparatus.

Apparatus for solving such a set of equations is shown in Fig. 1. It consists of a number of separate devices indicated by boxes in Fig. 1, and interconnections between them. In order to simplify the diagram, the connections are shown as single lines and the terminals as single dots, but it is to be understood that each connection may consist of one, two or more wires and each terminal may include connecting points for a number of wires.

The boxes marked $f_1, f_2 \ldots f_n$ represent computing channels. Each has a single output terminal and $n$ input terminals $1, 2 \ldots n$. The computing channels are arranged to perform on signals supplied to their inputs the mathematical operations which the equations indicate as to be performed on the unknown quantities. Since the functions may not be symmetrical, the input terminals of each computing channel must be identified with the individual unknown quantities whose function is to be computed. Thus the computing channel $f_1$, for example, is arranged to give out a signal equal to $f_1(x_1, x_2 \ldots x_n)$ only when $x_1, x_2 \ldots x_n$ are taken as representing the values of the signals introduced into the computing channel at the input terminals marked 1, 2 ... n. The computing channels, which may be entirely electric channels or may be electrical and optical or electrical and mechanical, include such of the known means of performing mathematical operations as are required to compute the particular functions stated in the equations. As examples of such known means, we cite the electrical multiplying and integrating devices described by Robert N. Varney (Review of Scientific Instruments, vol. 13, No. 1, pp. 10–16, Jan. 1942) and the electrical means for obtaining exponential functions and the optical means for multiplication described by V. C. Hall in U. S. Patent 2,286,730, June 16, 1942. The coefficient values may be adjusted by the use of adjustable resistances as stated by Hall (U. S. Patent 2,286,730, p. 4, col. 1, ll. 16–21) or by adjusting inductances as described by R. R. M. Mallock (British Patent 389,524, p. 1, ll. 43, 44).

The boxes marked $A_1$, $A_2$, etc. represent signal circuits. Each of these signal circuits includes measuring, computing or other means for creating electric signals whose values represent the values of the known terms of the equations. In the case where the known terms are variables, the signal circuits are so arranged that at each instant the value of the signal in the circuit $A_1$ represents the value of the known variable $A_1$ at that instant, etc. As an example of a signal circuit which may be used in the apparatus, we cite the photocell circuit of a picture scanning apparatus which is appropriate when the known terms of the equations are the tone values of a picture or of a color component of a picture.

The boxes marked $X_1$, $X_2$, etc. represent high-gain amplifiers of any usual construction, but most desirably of the D. C. type as shown for example in Smith U. S. Patent 1,622,851, March 29, 1927, so that signals of zero frequency may be used; and the boxes marked $S_1$, $S_2$, etc. represent any convenient type of subtraction device for opposing two electric signals and determining and transmitting the difference between them. The subtraction devices may consist merely of means for opposing the two electrical quantities as shown in Fig. 20 of A. C. Hardy U. S. Patent 2,193,722, March 12, 1940, or of means for opposing magnetic flux determined by them as shown in Fig. 1 of Müller U. S. Patent 1,943,900, January 16, 1934.

The amplifiers are used in the manner hereinafter explained to generate signals representing the unknowns $x_1$, $x_2$, etc. in the equations. The output of the amplifier $X_1$ is conducted to the input terminal 1 of each of the computing channels and also to the output terminal $O_1$ of the apparatus, the output of the amplifier $X_2$ is conducted to the input terminal 2 of each of the computing channels and also to the output terminal $O_2$, and the outputs of the other amplifiers are similarly conducted to the computing channels and to the other output terminals $O_3 \ldots O_n$ of the device. While Fig. 1, for the sake of completeness, shows each amplifier connected to one input terminal of each of the computing channels, it will be understood that some of these connections are unnecessary in cases where the coefficients of the unknowns of some of the equations are zero. Thus, for example, if the function of the unknown quantities stated in the second equation, $$f_2(x_1, x_2, x_3 \ldots x_n)$$

should have the form $$x_1^2 + 2x_2 + 0x_3 \ldots + 0x_n$$

which would, of course, ordinarily be written merely $$x_1^2 + 2x_2$$

the amplifiers $X_1$, $X_2$ are the only ones of the amplifiers which need be connected to the computing circuit $f_2$.

The output of the signal circuit $A_1$ and the output of the computing channel $f_1$ are conducted to the input terminals of the subtraction device $S_1$, the outputs of the other signal circuits and the other computing channels are similarly conducted to the other subtraction devices, and the output of each subtraction device is fed through a connection C to the input terminals of one of the amplifiers to generate a signal representing one of the unknowns.

The operation is as follows: Signals corresponding to the known terms of the equations are developed in the signal circuits and introduced into the subtraction devices. At the start no signals are coming from the amplifiers to the computing channels and the subtraction devices at the first instant transmit signals to the amplifiers, causing the amplifiers to send amplified signals to the various input terminals of each of the computing channels. The computing channels compute functions of these signals and transmit them to the subtraction devices where they are subtracted from the signals received from the signal circuits corresponding to the known terms of the equations. This reduces the signals sent from the subtraction device outputs to the amplifiers and, therefore, changes the signals sent from the amplifiers into the computing channels. This reduction continues until an equilibrium is obtained in which the output of each subtraction device is so small that it may be said to approximate zero, although it must, of course, be sufficient to excite an amplifier. When this condition of equilibrium has been obtained, it indicates that the values of the functions obtained from the computing channels are substantially equal to the known values developed in the signal circuits, so that the outputs of the amplifiers are substantially equal to the required values of the various unknown quantities. The values of the unknowns obtained by solving the equations may be observed, recorded or used by suitable indicating, recording or other devices connected to the output terminals $O_1, O_2 \ldots O_n$.

Figure 2:
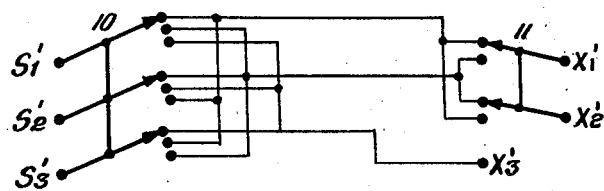
Fig. 2 is a diagram of a network which may be used in the apparatus.

It should be noted that, in the operation which has been described, the generation of the signal representing each individual unknown quantity is controlled by balancing the known and unknown terms of one of the equations. As the number of unknown quantities is equal to the number of equations, it may therefore be theoretically possible to use any one of the equations to control any one of the unknown quantities. It has been found, however, in the use of the apparatus that the arrangement of the connections C between the subtraction devices and the amplifiers is of importance in securing stable equilibrium. With any particular set of equations having definitive, real solutions, there is at least one arrangement of the connections C which will give a condition of stable equilibrium. This arrangement can always be determined empirically, by trying each of the $n!$ possible arrangements of connections between the $n$ subtraction devices and the $n$ amplifiers. Thus, for example, where there are three equations and three unknowns, the three subtraction devices and the three amplifiers may be connected by the network shown in Fig. 2 which includes a three-blade, three-point switch 8 whose pivot terminals $S_1'$, $S_2'$, $S_3'$ are connected to the output terminals of the three subtraction devices and a two-blade, two-point switch 9 whose pivot terminals $X_1'$, $X_2'$ are connected to the input terminals of the amplifiers $X_1$, $X_2$, and a fixed terminal $X_3'$ connected to the amplifier $X_3$. By placing the switch 8 in each one of its three possible positions, while the switch 9 is placed in each one of its two positions, the six possible arrangements of the connections between the subtraction devices and the amplifiers may be tested very rapidly so as to select the one which produces stable equilibrium in the whole circuit. (Each connecting line of Fig. 2 may indicate one, two or more wires.)

The arrangement thus selected empirically may, at least in the case of some sets of equations, be described mathematically as that arrangement in which the difference between the signals representing the two sides of each equation is fed to the amplifier generating the signal representing the one of the unknown quantities which predominates in the function of the unknown quantities stated in that equation. In some cases, this arrangement can be determined from inspection of the equations or by tests made with the separate computing devices. To do this, where it is practicable, the procedure is as follows:

(1) The function of the unknown quantities stated in each equation is examined separately to ascertain which of the unknown quantities is dominant in this function over the range of values for which a solution of the equations is desired. If this cannot be determined from an inspection of the function as stated in the equation, it may be ascertained by applying arbitrary signals to the inputs of the computing channel representing the function stated in this equation, making equal changes in each signal within the range in question, and ascertaining which has the greatest effect on the output of the computing device.

(2) If it is found that within the range in question the form of the function $f_1$ is such that the value of $f_1(x_1, x_2 \ldots x_n)$ is more affected by changes in $x_1$ than by changes in any other of the unknowns, that $x_2$ is the dominant factor in the functions $f_2(x_1, x_2 \ldots x_n)$, etc., $x_n$ being the dominant factor of the function $f_n(x_1, x_2 \ldots x_n)$, the connections are made as shown in Fig. 1. In cases where it is found that one of the unknowns dominates in the function stated in more than one of the equations or in cases where it is found that more than one of the unknowns are equally dominating in one equation, a comparison of the equations is necessary as follows:

(3) If some particular unknown quantity is found to be dominant in the functions stated in more than one equation, these functions are then compared to determine which of them is more affected by the dominant unknown. This unknown should be controlled by the equation containing the function on which it has more effect, and the remaining equation is then used to control the other unknown. Thus, for example, in the case of two simultaneous equations of the form $$6x_1 + 4x_2 = A_1$$

and $$7x_1 + 3x_2 = A_2$$

$x_1$ is dominant in the functions stated in both equations, but it has a greater effect in the second equation than it has in the first equation. The second equation should, therefore, be used to control the value of $x_1$ and the first to control the value of $x_2$.

(4) If two or more unknowns are found to have equal effects on the function in one equation, the one of these unknowns which dominates in some other equation is controlled by that other equation and the first equation is controlled by the remaining unknown. Thus, for example, in the case of equations in the form $$5x_1 + 5x_2 = A_1$$

and $$7x_1 + 3x_2 = A_2$$

the second equation is used to control $x_1$ because $x_1$ dominates the function of that equation, and the remaining unknown, $x_2$, is, therefore, controlled by the first equation in which the effects of the two unknowns are equal.

It will be found that the application of these rules in each case leads to the same arrangement of the connections C as would be found by the empirical method of determining the arrangement which gives stable equilibrium.

To illustrate the use of the invention, we have shown in Figs. 3 and 4 a circuit applying the invention to the solution of the following illustrative simultaneous equations:

$$A_1 = ax_1 - bx_2^2$$
$$A_2 = cx_1x_2 + dx_2$$

The general arrangement of the apparatus shown in Fig. 3 is similar to that shown in Fig. 1. Parts of the apparatus are indicated generally by dotted boxes identified by the reference symbols used in Fig. 1. The multiplier used as part of the computing channels of Fig. 3 is that described by R. M. Varney on page 14 of his article cited above. Fig. 4 shows the multiplier described by Varney in which currents corresponding to the two quantities to be multiplied are passed through the two coils of a dynanometer type of galvonometer and the product is measured by the current from a Variac controller on the shaft of a motor actuated through the torque amplifier described by Varney to counterbalance the torque produced by the dynanometer coils. In accordance with Varney's suggestion at the end of page 10 of his article, A. C. currents are used. Fig. 4 shows the Varney multiplier arranged to obtain a product of quantities $x_1$, $x_2$. In order to introduce a coefficient so as to obtain the product $-cx_1x_2$, the current through the Variac coil is made proportional to the coefficient $-c$.

To provide an A. C. current for the multiplier in accordance with the Varney suggestion, the circuit shown in Fig. 3 is made so as to represent all the quantities by A. C. voltages, although this is not essential to applicants' invention which may, if preferred, be used with direct current. To provide for A. C. operation, an A. C. generator such as a sine-wave generator 10 is connected to four potentiometers 11, 12, 13, 14. At the start, the potentiometers 13 and 14 are adjusted so that the voltmeters connected with them show A. C. voltages equal to the constant coefficients $b$ and $c$. In order to make the potentiometer 14 furnish the signal $-c$ when it is set to the voltage magnitude $c$, this potentiometer is connected to the sine-wave generator through a phase-reversing transformer 14' of one-to-one ratio. The potentiometers 11 and 12 constitute the signal circuits $A_1$, $A_2$ and may be adjusted as frequently as desired in order to solve the equations for different values of $A_1$ and $A_2$. The values of $A_1$ and $A_2$ for which the equations are being solved are indicated by voltmeters associated with the potentiometers 11 and 12.

The subtraction devices $S_1$, $S_2$ are mixing circuits of the type shown in Fig. 20 of Hardy Patent 2,193,722 and serve to pass currents from the potentiometers 11 and 12 and from the computing channels $f_1$, $f_2$ through common resistances 15, 16 so as to develop across these resistances voltages equal to the sums of the two applied voltages which, because of the phase relationship of the computing channels, results in producing voltages equal to the differences between the two sides of the two equations. These differences are fed back through the connections C to the high-gain amplifiers $X_1$, $X_2$ which, in this case, are of course of the A. C. type.

The computing channel $f_1$ receives A. C. voltages representing arbitrary values of the unknowns $x_1$, $x_2$ from the amplifiers $X_1$, $X_2$. The voltage $x_1$ appears across the resistance 17 of a potentiometer whose wiper is set in accordance with the coefficient $a$ so as to take off a voltage equal to $ax_1$, which is reversed in phase in a power amplifier 18 and led to a junction point 19.

The voltage $x_2$ is reversed in phase in a power amplifier 20 and fed to both dynanometer coils of a Varney multiplier such as shown in Fig. 4. The voltage $b$ from the potentiometer 13 is led to the Variac coil of this multiplier so that the output of the multiplier is the product $bx_2x_2$ or $bx_2^2$. This voltage is led to the junction point 19 where it is mixed with the voltage $-ax_1$ so as to produce a voltage equal to $-(ax_1-bx_2^2)$ which is put through a cathode follower 21 to reduce the impedance level and then fed to the subtracting device $S_1$.

The computing channel $f_2$ receives the voltages $x_1$ and $x_2$ of the amplifiers $X_1$, $X_2$. The term $dx_2$ is computed in the same manner as the term $ax_1$ was computed in channel $f_1$ and is led to the junction point 19' as $-dx_2$.

To compute the term $cx_1x_2$, the voltages $x_1$, $x_2$ are reversed in phase in power amplifiers 22, 23 and led to a Varney multiplier whose Variac coil receives the voltage $-c$ from the potentiometer 14. The output which represents the product $-cx_1x_2$ is led to the junction point 19', and the sum of the voltages at this point is put through a cathode follower 21' to reduce the impedance level and then led to the subtraction device $S_2$.

The outputs of the two amplifiers are also led to voltmeters $O_1$, $O_2$ where the values of the unknowns $x_1$, $x_2$ may be read.

In using this device, the potentiometers 13, 14, 17, 17' are set in accordance with the constant coefficients $a$, $b$, $c$, $d$. Each coefficient must, of course, be less than unity, a condition which may easily be obtained by dividing the term of each equation by whatever factor is necessary to make all the coefficients less than unity. If, after the coefficients have been set in, it should be found that the apparatus is unstable, it is necessary merely to interchange the connections C so as to lead the feedback from the subtraction device $S_1$ to the amplifier $X_2$ and from $S_2$ to $X_1$.

After the apparatus has been adjusted in this way, it may be used to solve the equations for the values of $x_1$ and $x_2$ which correspond to predetermined values for the known terms $A_1$, $A_2$. In order to do this, it is necessary merely to set the potentiometers 11, 12 to the values of $A_1$ and $A_2$ and then to read the values of $x_1$ and $x_2$ from the voltmeters $O_1$, $O_2$. The operation is very rapid, so that the solving of the equations for any given values of $A_1$ and $A_2$ takes no longer than is required to set the two potentiometers 11 and 12 and to read the two voltmeters $O_1$, $O_2$.

To illustrate further the use of the invention, we have shown in Figs. 5–9 a circuit for applying the invention to the solution of the following color equations:

$$X=(1-c)(1-m)(1-y)X_w+c(1-m)(1-y)X_c+m(1-c)(1-y)X_m+y(1-c)(1-m)X_y+my(1-c)X_{my}+cy(1-m)X_{cy}+cm(1-y)X_{cm}+cmyX_{cmy} \quad (1a)$$

$$Y=(1-c)(1-m)(1-y)Y_w+c(1-m)(1-y)Y_c+m(1-c)(1-y)Y_m+y(1-c)(1-m)Y_y+my(1-c)Y_{my}+cy(1-m)Y_{cy}+cm(1-y)Y_{cm}+cmyY_{cmy} \quad (1b)$$

$$Z=(1-c)(1-m)(1-y)Z_w+c(1-m)(1-y)Z_c+m(1-c)(1-y)Z_m+y(1-c)(1-m)Z_y+my(1-c)Z_{my}+cy(1-m)Z_{cy}+cm(1-y)Z_{cm}+cmyZ_{cmy} \quad (1c)$$

In these equations X, Y, Z are known quantities whose values may be obtained from photocell circuits scanning color-separation photographs of a colored original to be reproduced. $X_w \ldots Z_{cmy}$ are constants and $c$, $m$ and $y$ are the unknowns for which the equations are to be solved.

Figure 5:
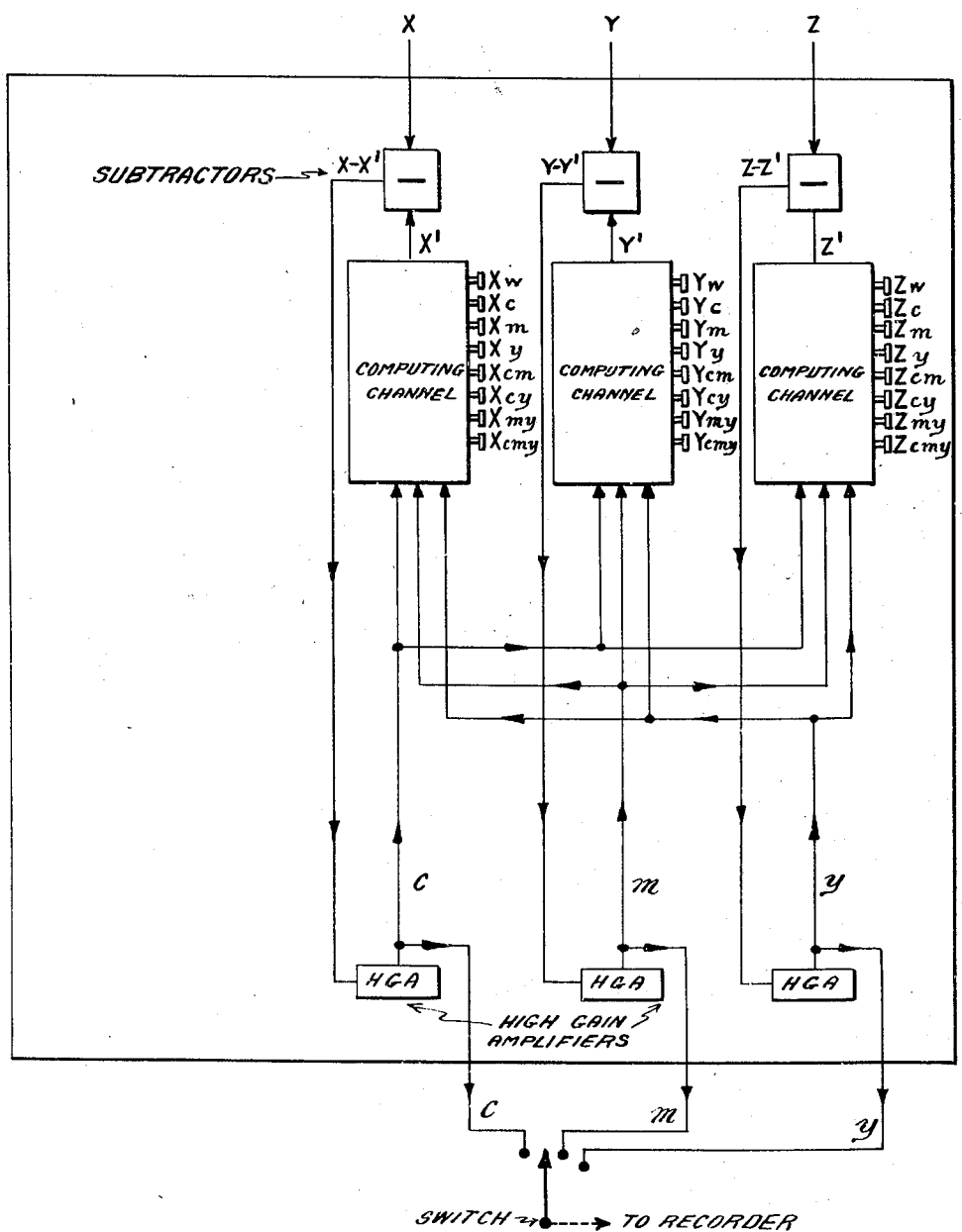
Fig. 5 is a block diagram showing the application of the invention to the solution of color equations.

Fig. 5 is a block diagram of a calculator for solving these equations. Three signals X, Y, Z from photocells are led into subtractors which also receive signals X', Y', Z' from three computing channels. The subtractors put out signals X−X', Y−Y', Z−Z' which are led to three high-gain amplifiers. The amplified signals from the three amplifiers are, in the first instance, arbitrary values which may be taken as representing the three unknowns $c$, $m$, $y$. Each of the signals from the three amplifiers representing arbitrary values for the three unknowns $c$, $m$, $y$ is led into each of the three computing channels.

The three computing channels perform the mathematical operations indicated on the right-hand sides of the above equations on the three signals received by each computing channel from the high-gain amplifiers. To enable each computing channel to make the required calculation, the constants $X_w \ldots X_{cmy}$ are set into the first computing channel, the constants $Y_w \ldots Y_{cmy}$ are set into the second computing channel, the constants $Z_w \ldots Z_{cmy}$ are set into the third computing channel before the beginning of the operation.

The signals X', Y', Z' put out by the computing channels are not, in the first instance, equal to X, Y and Z because they represent merely the required functions of arbitrary values representing the unknowns $c$, $m$, $y$. As soon as the operation starts, the calculated signals X', Y', Z' are subtracted from the photocell signals X, Y, Z, reducing the signals sent from the subtractors to the amplifiers, and thereby changing the values of the signals $c$, $m$, $y$ sent into the computing channels by the amplifiers. The polarity of the computing channels is such that the changes in $c$, $m$, $y$ modify the computed values X', Y', Z' until X' differs from X, Y' differs from Y, and Z' differs from Z by amounts which may be made as small as desired by using sufficient amplification in the high-gain amplifiers. When this condition of substantial equality between the computed signals and photocell signals has been reached, it is evident that the values attained by the signals $c$, $m$, $y$ are solutions of the above equations.

Figure 6:
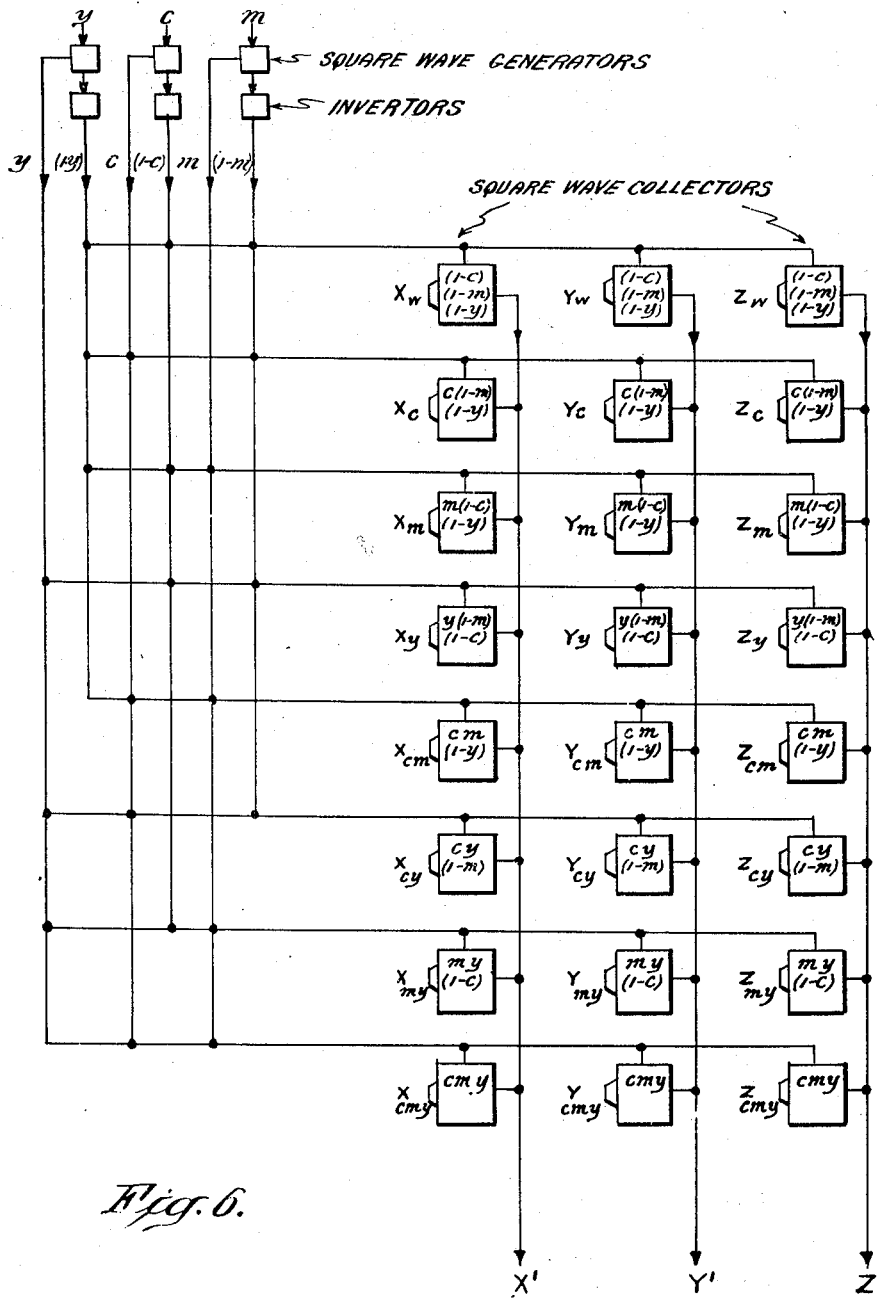
Fig. 6 is a block diagram of the circuits of the three computing channels indicated in Fig. 5.

Fig. 6 is a block diagram of the circuits contained in the three computing channels shown in Fig. 5. It appears from the above equations that one of the operations which must be performed by the computing channels consists in multiplying together three different quantities. This multiplication is effected on the basis of the probability principle that, if an event $a$ happens $a\%$ of the time and an event $b$ happens $b\%$ of the time, then the proportion of the time when both events occur simultaneously is the product $a\% \cdot b\%$. To utilize this principle, a series of rectangular waves (or square waves as they are commonly called) is generated for each factor to be multiplied. In each series the length of the pulses is so related to the length of the spaces between the pulses that the length of a pulse divided by the length of a cycle is equal to the factor. In order to approach a random distribution which would result in perfectly accurate multiplication, the frequencies of the waves for each factor must be irrationally related. The frequencies should be so selected that, when the signals are combined, all beats are of sufficiently high frequency to be filtered out or are of small amplitude compared with the amplitude of the waves representing the factors. Said frequencies may be selected for any usual or desirable rate of scanning, such for example as the rate of ten inches per second. The multiplication is effected by leading the three series of square waves representing the three factors to be multiplied to a collector which indicates the percentage of the time during which pulses occur simultaneously in all three series.

As shown in Fig. 6, each of the three signals $c$, $m$, $y$ is led to a square-wave generator. These three generators produce series of square waves of different frequencies. Each generator is so controlled by the signal which it receives that the ratio between the pulse length and the cycle length in the series of square wages which it generates varies with the received signal. The outputs of the three generators are, therefore, series of square waves representing the values $c$, $m$, $y$.

The output of each square-wave generator is also led into an inverter. Each inverter puts out a series of square waves in which the ratio of the pulse length to the cycle length is equal to one minus the signal which it receives. The three inverters, therefore, put out series of square waves representing the values $(1-c)$, $(1-m)$, $(1-y)$ respectively.

By the network shown in Fig. 6, the six series of square waves from the square-wave generators and inverters are distributed among twenty-four square-wave collectors to produce the twenty-four products contained in the above equations. The eight square-wave collectors shown in the first column in Fig. 6 produce signals corresponding to the eight terms on the right-hand side of the first equation. Thus, the first of these collectors has its input connected to receive the series of square waves corresponding to $(1-c)$, $(1-m)$, $(1-y)$, and produces a signal which indicates the proportion of the time in which pulses occur simultaneously in all three series, and, therefore, proportional to the product $(1-c)(1-m)(1-y)$. In order that the output of this collector may represent the first term of the first equation, the constant $X_w$ is set into the collector before the start of operations.

The other collectors in the first column are connected and adjusted to produce signals corresponding to the other terms on the right-hand side of the first equation and the outputs of these collectors are fed by a common conductor into a low-pass filter so that they are added to produce the signal $X'$, the computed value of the right-hand side of the first equation based on the values of the signals $c$, $m$, $y$ which control the three square-wave generators.

The collectors in the other two columns produce the signals $Y'$, $Z'$ in the same manner.

Figure 7:
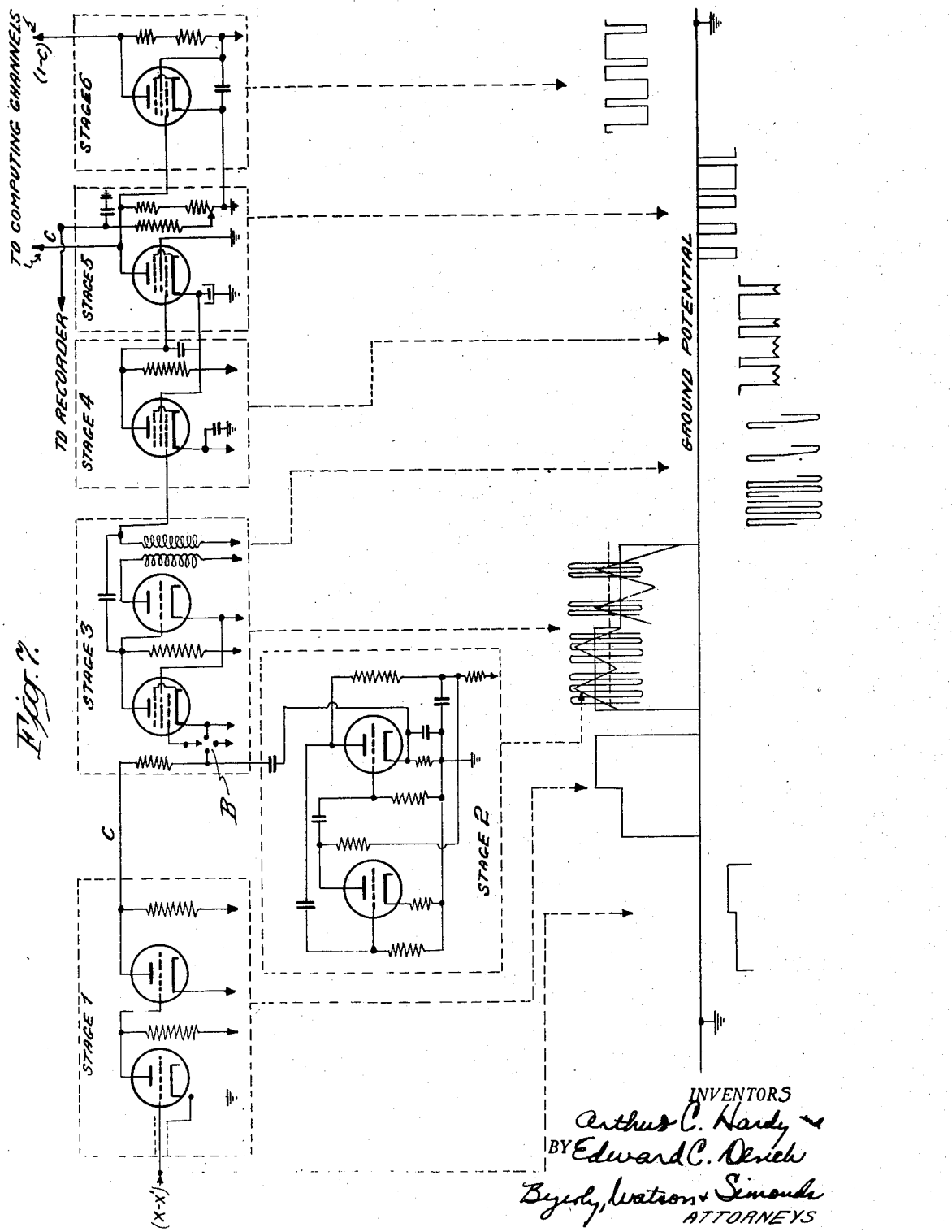
Fig. 7 is a diagram of a circuit including one of the amplifiers indicated in Fig. 5 and one of the square-wave generators and one of the inverters indicated in Fig. 6.

The details of the electrical apparatus forming the calculator which has been described may be greatly varied within the scope of our invention; but, for the sake of illustration, we will describe the particular apparatus and circuits which we have found most satisfactory:

Fig. 7 is a circuit diagram including one of the high-gain amplifiers shown in Fig. 5 and one of the square-wave generators and one of the inverters shown in Fig. 6. The lower part of the figure shows the form of the waves and the potential to ground in the different stages of the circuit.

Stage 1 of the circuit illustrated in Fig. 7 is a high-gain D. C. amplifier containing two triodes. The signal voltage $(X-X')$ from one of the subtractors is amplified in stage 1 to produce the signal voltage $c$ (see Fig. 5) which is fed to stage 3.

Stages 2, 3, 4 and 5 of the circuit shown in Fig. 7 constitute the square-wave generator for the signal $c$ shown in Fig. 6.

Stage 2 is a conventional triangular wave generator and stage 3 is an oscillator trigger circuit which, when triggered, generates a wave of much higher frequency than that of the triangular wave generated in stage 2.

The triangular wave voltage from stage 2 and the signal voltage $c$ from stage 1 are added and applied to the trigger circuit of stage 3. When the sum of the triangular wave voltage and the signal voltage exceeds the critical trigger voltage, the oscillator of stage 3 is triggered and continues to oscillate until the signal voltage plus the triangular wave voltage falls below this critical trigger value. The per cent. of time that the oscillator is on is proportional to the signal voltage. As a result, the oscillator produces groups of short waves separated by spaces as indicated in the diagram below stages 2 and 3 of the circuit. The frequency of the groups of short waves is the frequency of the triangular wave generated in stage 2, while the ratio of the length of each group of waves to the length of the cycle is equal to the signal voltage $c$.

The groups of oscillations from stage 3 are fed into stage 4 which is a detector which converts them into pulses of D. C. constituting a conventional square wave. These square-wave pulses are sent to a power amplifier which is stage 5 of the circuit. When the output of stage 4 is applied to the grid of the power amplifier of stage 5, the residual ripple occurs below the cut-off grid voltage and hence does not appear in the output of stage 5 (see wave form shown below stages 4 and 5).

The output of stage 5 is a train of square waves corresponding to the signal $c$ which is distributed among the various square-wave collectors by the network shown in Fig. 6. This output is also fed to an inverter forming stage 6 of the circuit. The output of the inverter is a train of square waves corresponding to the signal $(1-c)$ and is distributed among the square-wave collectors by the network shown in Fig. 6.

The arrows along the bottoms of the different stages of the circuits shown in Fig. 7 indicate connections to D. C. potentials. The biases to be used are indicated by the diagram at the bottom of Fig. 7 which shows the voltage relation between each stage and ground.

The switch B in stage 3 is used to simplify adjustment when the circuit is used as part of color correction apparatus as described in our Patent 2,434,561 in column 15 on lines 20 to 26.

Fig. 8 shows one of the square-wave collectors indicated in Fig. 6. While the circuits of all the collectors are the same, the one shown may be taken to be the fifth one in the first column of Fig. 6 which computes the term $$cm(1-y)X_{cm}$$

of the first equation.

At the left-hand side of Fig. 8 are shown leads from the square-wave generators and inverters producing square-wave signals representing the values $c$, $m$, $(1-y)$. These three leads are connected together and to the control grid of a multi-grid tube to produce a negative bias such that it cuts off the flow of plate current except when positive voltage pulses occur in all three connected leads simultaneously. Whenever this happens, the bias becomes sufficiently positive to permit the flow of plate current in the multi-grid tube. The amplitude of the current pulses thus produced in the plate current of the multi-grid tube is controlled by the bias of the screen grid of the tube which is set by means of a potentiometer so that the amplitude of the plate current is proportional to the constant $X_{cm}$. The average plate current represents the product of the amplitude of the current pulses and the fraction of the time when such pulses exist. It is, therefore, proportional to the term $$cm(1-y)X_{cm}$$

of the first equation. To obtain a signal proportional to the average plate current, the plate of the tube is connected to an R.-C. filter whose time constant is large enough to filter out the frequencies of the trains of square waves and beat frequencies so as to produce a D. C. voltage proportional to the average plate current. The time constant of the filter is, however, small enough to allow changes rapid enough to give adequate resolution at the speed of scanning used.

The multiplying apparatus which has been described is not claimed herein because it forms the subject-matter of our application Serial No. 713,658 filed December 3, 1946, as a division of our application Serial No. 543,990 filed July 8, 1944.

The tubes forming the other collectors shown in the first column in Fig. 6 are connected directly to the R.-C. filter shown in Fig. 8 in such manner that their plate currents pass through a load resistance L connected to the filter. The signal output voltage of the filter will, therefore, be proportional to the sum of the average plate currents in all of these tubes and will, therefore, be the required X' signal.

Fig. 9 shows one of the subtractors indicated in Fig. 5. It consists of two resistors whose outer ends are connected to one of the photocells and to the output of one of the computing channels so as to add voltages of opposite polarity corresponding to the signals X and X'. The algebraic sum of the two voltages which is equal to the difference between the values which the voltages represent is led off by a conductor from the connected inner ends of the resistors and led into the amplifier forming the first stage of the circuit shown in Fig. 7 to generate the signal $c$. For convenience, a potentiometer may be connected to the output point of the subtractor to control the relation to ground of the voltage $(X-X')$.

The operation of the machine which has been described is apparent from the description which has been given.

This application contains subject-matter presented to the Patent Office in applicants' co-pending applications Serial No. 467,042, filed November 26, 1942, and Serial No. 543,990, filed July 8, 1944, and no other subject-matter. Application Serial No. 543,990 was abandoned in favor of application Serial No. 688,749, filed August 6, 1946, on which Patent No. 2,434,561 was issued on January 13, 1948. Application Serial No. 467,042 has been abandoned in favor of the present application.

What is claimed is:

1. An electrical apparatus for solving a set of simultaneous equations, comprising signal circuits and means for establishing in them signals corresponding to the known terms of the equations, computing channels arranged to perform the mathematical operations which the equations indicate as to be performed on the unknown quantities, subtracting devices of which each has its input terminals connected to the signal circuit and the computing channel corresponding to one equation, high-gain amplifiers having their output terminals connected to the computing channels and to the output terminals of the apparatus, and a connection between the output terminal of each subtraction device and the input of one of the amplifiers.

2. An electrical apparatus for solving a set of simultaneous equations, comprising signal circuits and means for establishing in them signals corresponding to the known terms of the equations, computing channels arranged to perform the mathematical operations which the equations indicate as to be performed on the unknown quantities, subtracting devices of which each has its input terminals connected to the signal circuit and the computing channel corresponding to one equation, high-gain amplifiers having their output terminals connected to the computing channels and to the output terminals of the apparatus, and a connection between the output terminal of each subtraction device to the input terminal of one of the amplifiers, said connections being arranged so that the apparatus maintains a stable equilibrium.

3. An electrical apparatus for solving a set of simultaneous equations, comprising signal circuits and means for establishing in them signals corresponding to the known terms of the equations, computing channels arranged to perform the mathematical operations which the equations indicate as to be performed on the unknown quantities, subtracting devices of which each has its input terminals connected to the signal circuit and the computing channel corresponding to one equation high-gain amplifiers having their output terminals connected to the computing channels and to the output terminals of the apparatus, and connections between the output terminals of the subtraction devices and the input terminals of the amplifiers including switching means permitting a rearrangement of said connections so that the arrangement which produces stable equilibrium may be selected.

4. An electrical apparatus for solving $n$ simultaneous equations of the form $$f_1(x_1, x_2 \ldots x_n) = A_1$$
$$f_2(x_1, x_2 \ldots x_n) = A_2$$
$$\vdots$$
$$f_n(x_1, x_2 \ldots x_n) = A_n$$

comprising $n$ output terminals, $n$ signal circuits and means for establishing in them signals corresponding to the known terms $A_1, A_2 \ldots A_n$, $n$ computing channels each having input terminals corresponding to the unknown quantities $x_1$, $x_2 \ldots x_n$ and arranged to perform the mathematical operations $f_1, f_2 \ldots f_n$ on signals applied to its input terminals, $n$ subtracting devices of which each has its input terminals connected to the signal circuit and the computing channel corresponding to one equation, and $n$ high-gain amplifiers each of which has its output terminal connected to the one of the input terminals of each computing channel corresponding to one of the unknown quantities and to one of the output terminals of the apparatus and its input terminal connected to the output terminal of the one of the subtraction devices which is connected to the computing channel for computing the function in which said unknown is predominant.

5. An electrical apparatus for solving a set of simultaneous equations comprising signal circuits and means for establishing therein signals corresponding to the known terms of the equations, computing channels arranged to perform the mathematical operations which the equations indicate as to be performed on the unknown quantities, means for generating arbitrary signals representing the unknown quantities in the equations and feeding them to the computing channels, means for opposing the signal representing the known term of each equation to the signal representing the function of the unknown quantities stated in that equation, and means for utilizing the difference between the opposed signals representing the terms of each equation to modify the signal representing one of the unknown quantities until all said differences are reduced to the minimums required to control the signal-generating means.

6. An electrical apparatus for solving simultaneous equations comprising signal circuits and means for establishing in them electrical signals corresponding to the known terms of the equations, computing channels arranged to perform the mathematical operations which the equations indicate as to be performed on the unknown quantities, means for generating arbitrary electrical signals representing the unknown quantities in the equations and feeding them to the computing channels, means for opposing the signal representing the known terms of each equation to the signal representing the function of the unknown quantities stated in that equation, and electrical feedback channels amplifying the difference between the opposed signals and delivering the amplified difference signal to the means for generating signals representing one of the unknown quantities.

7. An electrical apparatus for solving a set of simultaneous equations comprising signal circuits and means for establishing in them electric signals corresponding to the known terms of the equations, electric computing circuits arranged to perform substantially instantaneously the mathematical operations which the equations indicate as to be performed on the unknown quantities, electric subtracting devices of which each has its input terminals connected to the signal circuits and the computing channel corresponding to one equation, amplifiers having their output terminals connected to the computing channels and to the output terminals of the apparatus, and a connection between the output terminal of each subtraction device and the input of one of the amplifiers.

8. An electrical apparatus for solving a set of simultaneous equations comprising signal circuits and means for establishing therein electric signals corresponding to the known terms of the equations, electric computing channels arranged to perform substantially instantaneously the mathematical operations which the equations indicate as to be performed on the unknown quantities, means for generating arbitrary electric signals representing the unknown quantities in the equations and feeding them to the computing channels, means for opposing the electric signal representing the known term of each equation to the electric signal representing the function of the unknown quantities stated in that equation, and means for utilizing the difference between the opposed electric signals representing the terms of each equation to modify the electric signal representing one of the unknown quantities until all said differences are reduced to the minimums required to control the signal-generating means.

ARTHUR C. HARDY.
EDWARD C. DENCH.

REFERENCES CITED

The following references are of record in the file of this patent:

UNITED STATES PATENTS

| Number | Name | Date |
| --- | --- | --- |
| 1,869,209 | Mead | July 26, 1932 |
| 1,893,009 | Ward | Jan. 3, 1933 |
| 2,381,826 | Levy-Savoye | Aug. 7, 1945 |
| 2,401,779 | Swartzel | June 11, 1946 |